L. T. SCOFIELD.
Pipe Joint.
No. 199,108. Patented Jan. 8, 1878.
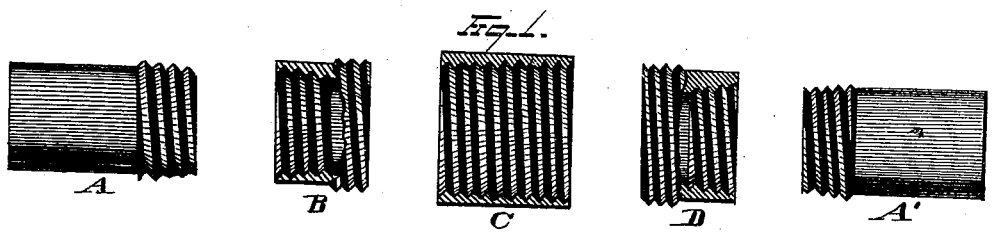
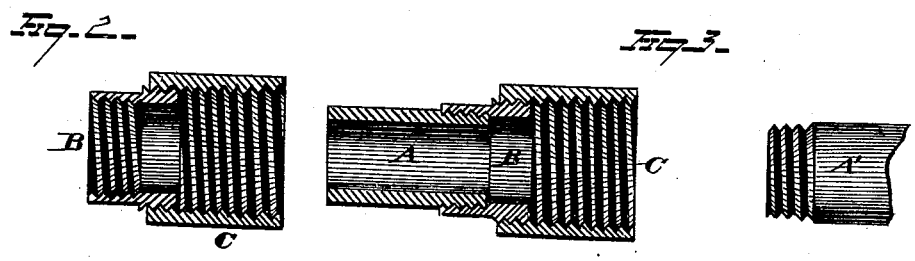
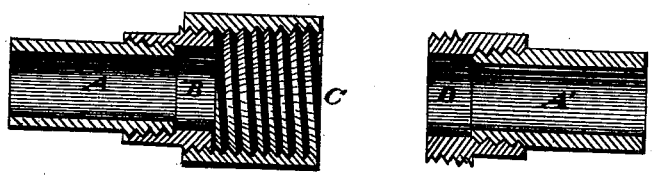
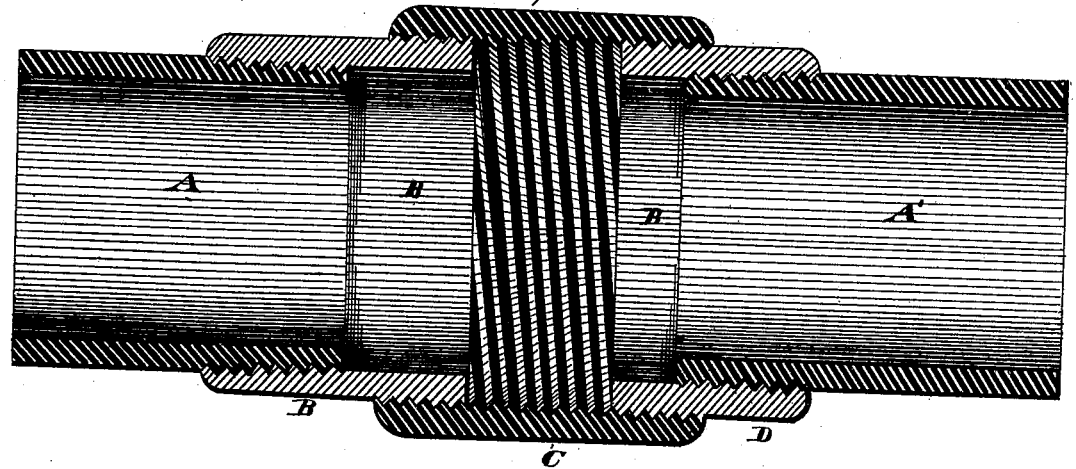

UNITED STATES PATENT OFFICE.

LEVI T. SCOFIELD, OF CLEVELAND, OHIO.

IMPROVEMENT IN PIPE-JOINTS.

Specification forming part of Letters Patent No. 199,108, dated January 8, 1878; application filed December 15, 1877.

*To all whom it may concern:*

Be it known that I, LEVI T. SCOFIELD, of Cleveland, in the county of Cuyahoga and State of Ohio, have invented certain new and useful Improvements in Pipe-Joints; and I do hereby declare the following to be a full, clear, and exact description of the invention, such as will enable others skilled in the art to which it pertains to make and use it, reference being had to the accompanying drawings, which form part of this specification.

My invention relates to pipe-joints; and it consists in peculiar arrangements of parts united by screw-threads, whereby is obtained a tight and reliable joint without the usual packing, and without any diminishment of the caliber of the general pipe-channel at the section-joints.

In the drawings, Figure 1 represents the different parts composing my pipe-joint separated from each other. Fig. 2 shows the first step required to form said joint; Fig. 3, the second step; Fig. 4, the third step; Fig. 5, the fourth step, and the completed joint in longitudinal section.

A is one end of an immovable pipe-section, and A' the opposing end of a next adjacent pipe-section. Each section A A' has formed upon it a conical or tapering screw-thread.

B is a collar, having a conical female screw made to fit upon the screw of the pipe A, and also having upon its other end a male screw-thread, also conical, with the cone-base facing toward the end opposite to that having the female screw just named. The threads of the male screw upon the collar B are raised so that the throats of the thread shall not extend below the plane of the body of the collar.

C is another collar, with a tapering female screw-thread cut throughout its entire length, the smaller or diminished end of which is formed to fit upon the conical or tapering male screw of the collar B.

D is another collar, similar to the collar B. It has upon one of its ends a tapering male screw, and upon its opposite end a tapering female screw, formed to fit upon the male screw of the pipe A', while its male screw is adapted for engagement with the female screw of the collar C at its enlarged end.

It will be noticed that all the threads of this pipe-joint are one-handed—*i. e.*, all either right-handed or left-handed, preferably right-handed.

Proceeding now to describe the manner of joining the various parts of my joint, we will suppose that the device has been uncoupled and removed, with the pipes A A' rigid, fixed, and immovable, and that it is desired to re-establish the joint without disturbing the pipes. First, as shown in Fig. 2 of the drawings, the parts B C are united. Second, as shown in Fig. 3 of the drawings, the parts B C are fixed upon the pipe A. This leaves sufficient space for the introduction and attachment of the part D to the pipe A', which is the third step, as shown at Fig. 4 of the drawings. The fourth and final step is shown in Fig. 5 of the drawings, which simply consists in turning the collar C until it engages with not only the collar B, but also the collar D. Now, by holding the collar B with pipe-tongs and turning the collar C, the entire joint is tightened and finished, and, owing to the conical or tapering character of all the screw-threads, no packing is necessary to prevent leakage.

The female screws of the parts B and D may be made of the various standard sizes to fit different pipes, and it is therefore apparent that the joint proper, consisting of the parts B C D, may constitute an independent article of manufacture, inasmuch as, the threads all being made according to standard measurements and requirements, this joint is readily applicable to pipes already in general use.

What I claim is—

1. The combination, with the part C, having an inner tapering screw-thread, of the parts B and D, each of which are provided with inner and outer tapering screw-threads, substantially as set forth.

2. The combination, with pipe-sections A A', provided with tapering screw-threaded ends, of the parts B and D, each of which have inner and outer tapering screw-threads, and the part C, provided with tapering screw-threads on its inner surface, substantially as set forth.

In testimony whereof I have signed my name to this specification in the presence of two subscribing witnesses.

LEVI T. SCOFIELD.

Witnesses:
F. TOUMEY,
W. E. DONNELLY.